United States Patent [19]
Haskell

[11] 3,786,548
[45] Jan. 22, 1974

[54] METHOD OF MAKING PRESTRESSED BEAMS

[76] Inventor: Robert E. Haskell, 1232 S. Lake Stickney Dr., Lynnwood, Wash. 98036

[22] Filed: June 8, 1972

[21] Appl. No.: 260,970

[52] U.S. Cl. .................................. 29/155 R, 29/452
[51] Int. Cl. ...................... B23p 17/00, B21d 39/00
[58] Field of Search ....... 29/155 R, 155 C, 452, 150

[56] References Cited
UNITED STATES PATENTS
2,887,762   5/1959   Dobell ............................. 29/452 X
3,349,537   10/1967  Hopfield .......................... 29/155 X

*Primary Examiner*—Thomas H. Eager
*Attorney, Agent, or Firm*—Richard W. Seed et al.

[57] ABSTRACT

A method of manufacturing a prestressed bimetallic beam including the steps of imbedding a high tensile element within a low tensile element and then mechanically welding the two elements by applying pressure to the low tensile members as a unit. This mechanical interlock and elongation places the high tensile member under stress which is uniform throughout the entire length of the low tensile encapsulating element. The result of such manufacturing technique is a bimetallic beam or the like which has the structural advantage of great strength and low weight. The high tensile elements are placed where necessary for each particular design including the expected stress and the low tensile element is then easily and economically machined or formed into the final desired exterior configuration.

7 Claims, 9 Drawing Figures

PATENTED JAN 22 1974    3,786,548

METHOD OF MAKING PRESTRESSED BEAMS

BACKGROUND OF THE INVENTION

It is well known in the art of fabrication of prestressed concrete members to imbed and elongate a high tensile strength member within the concrete member. The combination of a low tensile strength member having great compressive strength with a pretensioned and prestressed high tensile strength member imparts the relative advantages of each member to the others. Whereas the surrounding body, as concrete in prestressed concrete beams, is adequate to absorb a great deal of compressive forces, if it is subjected to substantial tensile stress, it will be much more likely to collapse. To fabricate a more usable structural member, a high tensile member is placed within a beam of low tensile strength such as concrete to absorb any tensile forces and hold the low tensile strength concrete in a compressed condition even while the entire body is placed under an elongated or tensile stress situation. The prestressed body members are normally of relatively small cross section, such that if they were subjected to compressive forces in and of themselves, they would buckle and not support the load. As is well known, the combination of the two elements results in a structure which is extremely versatile and capable of absorbing much greater variety of configurations and constructions.

Many of the same principles which have been applied successfully to concrete prestressed elements are applicable to metallic elements and many of the same problems are evident. For structures such as airplanes it is necessary to have structural members of very high strength and yet of low weight. Engineers and designers approach this ideal only approximately using the present metallic elements available. One of the problems with the metallic elements which are used lies in the fact that with the increased tensile strength the inherent weight and hardness is likewise increased, thereby making the machining of the element extremely difficult.

Another problem which exists with the presently used alloys lies in the fact that many of the alloys which would be desirable from their tensile strength are also very expensive. Sufficient tensile strength within reasonable cost factors is available from a thin strand or rod, but since the structure into which they are incorporated is subjected to compressive as well as tensile stress, the thread or rod, as noted above, would buckle and thereby prove unsatisfactory.

It is an object of the present invention to provide a method of manufacturing a heretofore unavailable bimetallic beam which combines the low weight of a low tensile strength metallic element with the great strength of a high tensile metallic element.

It is yet another object of the present invention to provide a method of fabricating a bimetallic beam wherein the final configuration of the beam is easily conformable to a large number of design concepts.

Still another object of the present invention is to provide a method for fabricating a bimetallic beam wherein a member of high tensile strength is placed within a body of low tensile strength and the body of low tensile strength is subjected to extremely high pressure. The high compression pressure mechanically welds the high tensile member to the low tensile member. During the time the low tensile member is subjected to pressure necessary for mechanical bonding, the low tensile member is caused to alter its exterior shape to the desired configuration and the high tensile members elongated resulting in a bimetallic beam under a prestressed condition which incorporates the properties of both basic elements.

DETAILED DESCRIPTION OF THE DRAWINGS

Figure 1:
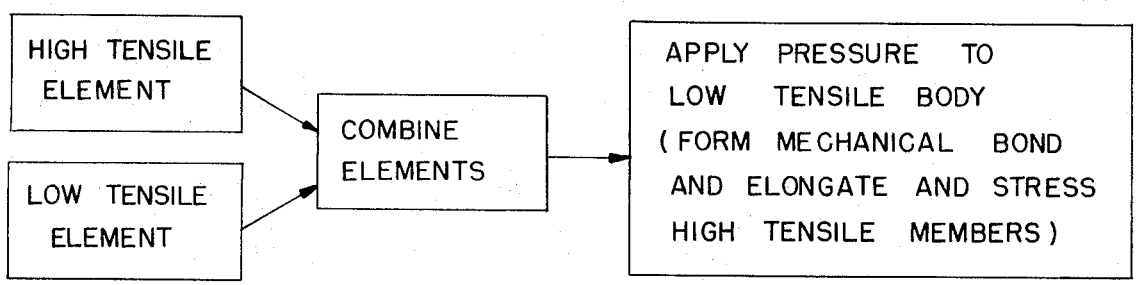
FIG. 1 is a schematic representation of the major steps in fabricating a bimetallic prestressed beam in accord with the present invention.

As seen in FIG. 1 there is a schematic representation of the steps in the manufacture of a bimetallic prestressed beam. The prestressed beam could be fabricated from a high tensile alloy such as titanium or steel and be encased in an aluminum alloy body. Although these particular elements are satisfactory, the scope of the present invention is not intended to be so limited.

The combining of the two elements could be either by placing the high tensile alloy bar or rod into a machined opening or bore in the low tensile body. Alternatively, two complementary shaped elements with corresponding bores machined in abutting surfaces may be used and the high tensile element(s) could be placed within one of the grooves and the complementary second member be placed thereover. The entire unit is then treated as a whole and processed as described hereinafter.

Following the physical combination of the high tensile rod or bar within the body of a low tensile element the entire combination is subjected to extreme pressure by any of several processes. Processes which are suitable to this pressure technique include rolling, swaging, forging, explosive or high impact forming. These processes force a mechanical closure of the body cavities and create a pressure bond or mechanical weld between the tensile rods and encapsulating low tensile member. During the high pressure forming and bonding the low pressure body is shaped to its desired configuration and the high tensile body is elongated and uniformly stressed.

The resultant bimetallic beam may be machined, fastened to or formed within the limits of the tensile members and in some instances, more specifically illustrated hereinafter, may be welded without affecting the inherent strength of the tensile members.

The fusion bonding techniques may be utilized to enable two-piece assembling of the body portion where complete assembly is then put through high pressure rolls as in a steel rolling mill to reduce size sufficiently to force a mechanical weld to all components. For uniform tension within the bimetallic beam it is recommended that the high tensile member have an outer surface which is rough to the touch and in fact probably should be of a roughness which is similar to that found in cement reinforcing elements with outwardly protruding ridges. The roughness of the high tensile member will cause a more rigid bond between the high tensile member and the low tensile element, thereby reducing relative movement during fabrication or later during actual stresses.

Figure 2:
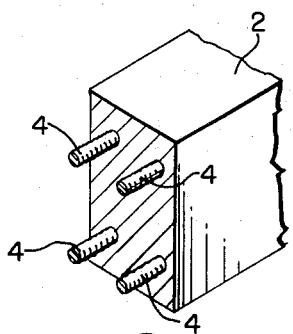
FIG. 2 is a perspective view of a bimetallic beam following the combination of the two elements.

Referring now to FIG. 2, one form of the combined but unwelded bimetallic beam is shown wherein a low tensile member 2 has had placed therein high tensile elements 4. The high tensile elements are placed within bores machined or cast within the low tensile member.

Figure 3:
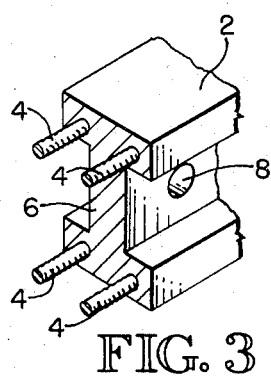
FIG. 3 is a perspective view of the beam of FIG. 2 following elongation of the high tensile members and shaping of the low tensile member.

In FIG. 3 the low tensile member 2 of FIG. 2 has now been machined or rolled to the standard configuration of an I-beam with the high tensile members 4 at the outer edges of the base and top member of the "I." The central web portion 6 of the I-beam has been reduced to lessen the overall weight and such is done without greatly decreasing the overall strength. Further, it is to be noted that holes 8 have been bored in the web to further reduce weight substantially without decreasing the integral strength of the beam.

Figure 4:
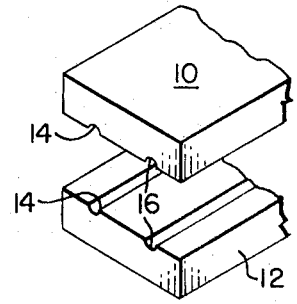
FIG. 4 is a perspective view of one method of preparing the low tensile member to receive the high tensile element.

Referring now to FIG. 4 there is shown one alternate method of forming a bimetallic beam. Using this alternate method two separate low tensile outside members 10 and 12 are formed with grooves 14 and 16 cast or otherwise formed therein. It is to be noted that the grooves are complementary in that when the elements 10 and 12 are placed in contigous relationship, the grooves 14 and 16 will form a bore to receive the high strength tensile element.

Figure 5:
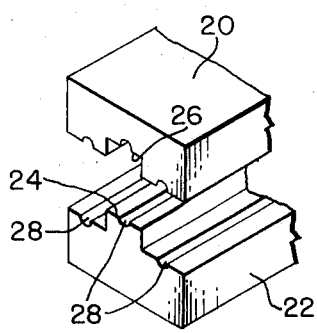
FIG. 5 is a perspective view of a basic means for forming a complex bimetallic element.

FIG. 5 shows a composite method of making a complex structural bimetallic beam incorporating the high tensile members in a plurality of planes. Similarly to the method described in FIG. 4, this element is formed with two complementary halves 20 and 22, such that when they are placed together, they will be completely interlocked and have no single uniplanar shear face. It is to be noted that the element 22 has an upstanding tongue 24 adapted to be received in the groove 26 of the element 20. For illustrative purposes, there is included in this example three grooves 28 in each of the elements which are aligned such that a high tensile element when placed in the grooves will fill the entire hollow portion when the elements 20 and 22 are placed in contiguous relationship.

Figure 6:
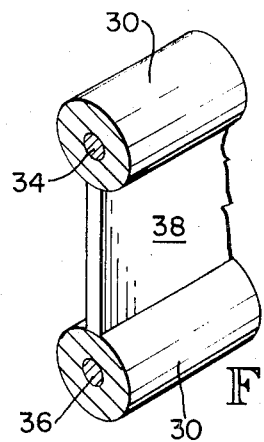
FIG. 6 is a perspective view of a fabricated beam made from basic prestressed elements and a combined webbing.

FIG. 6 is illustrative of a composite beam which may be made of two individual structural units 30 and 32 herein shown as annular rods of low tensile members having the high tensile element 34 and 36 captured therein. The two individual structural members 30 and 32 are then linked together by a web which may be welded or otherwise appropriately joined to the basic elements.

Figure 7:
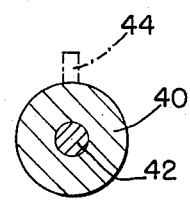
FIG. 7 is a sectional view of one form of prestressed bimetallic element.
Figure 8:
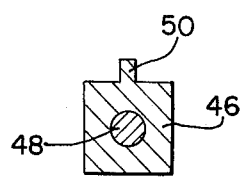
FIG. 8 is a sectional view of yet another form of prestressed bimetallic element.

FIGS. 7 and 8 show two possible configurations of structural elements such as described with relation to FIG. 6. These elements are of a unitary basis, relatively easily manufactured and have a high tensile element imbedded therein. As shown in FIG. 7, the modular element is similar to that used with respect to FIG. 6 and includes an annular low tensile element 40 having a high tensile element 42 imbedded therein. As shown in phantom lines, the unit could also include an outwardly projecting tongue 44, such that any weldment would be further spaced from the high tensile element, greatly reducing the possibility of altering the temper. The unit shown in FIG. 8 is of square cross section and is fabricated of a square tubular element 46 with high tensile element 48 imbedded therein and an upwardly extending tongue 50 which would be used for securing by weldment but is not an essential portion of the basic invention.

Figure 9:
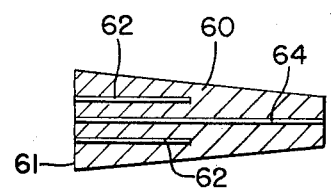
FIG. 9 is a sectional view through a tapered beam showing a possible configuration of prestressed elements which terminate intermediate the length of the beam itself.

As seen schematically in FIG. 9, it may often be desirable to have a tapered beam such as indicated generally at 60 wherein the stress requirements are less as you proceed from the base 61. Also, for many applications it is desirable to form a beam with a tapered contour to be placed in a structure which similarly has tapered configuration such as an airplane wing. For a construction of this type the high tensile elements 62 extend only part way through the low tensile strength element. The high tensile elements are held in place by their outwardly rough skin or interiorally formed projections or corrugations which are interlocked with the low tensile encapsulating body. In most instances, the tapered beam would include at least one high tensile member extending the entire length of the beam.

Thus it can be seen that with the use of the technique hereinabove described, a high strength, low weight bimetallic beam may be quickly and easily formed at very little cost. The resulting beam has the combined characteristics of both of the high and low tensile elements and yet is far less expensive in material than would be a beam made of strictly a higher tensile strength.

The embodiments of the invention in which an exclusive property or privilege is claimed are defined as follows:

1. A method of fabricating a prestressed, bimetallic beam comprising the steps of: placing one or more elongated members of high tensile strength within the confines of a bar of low tensile strength, securing the high tensile strength members within the bar, simultaneously subjecting the bar and high tensile strength members to pressure, uniformly elongating the assembly and stressing the high tensile strength members, whereby the prestressed beam may be fabricated and stressed in a single operation.

2. A method as in claim 1, wherein the high tensile strength rod is cast in place in a low tensile bar.

3. A method as in claim 1 wherein the low tensile strength bar is machined to provide a position to insert the high tensile rod.

4. A method as in claim 1, wherein the low tensile strength bar is extruded to include a cavity to receive the high tensile strength components.

5. A method as in claim 1, wherein the bimetallic unit is subjected to extreme pressure by a roll mill.

6. A method as in claim 1, wherein the bimetallic structure is placed under pressure by swaging.

7. A process as in claim 1, wherein the pressure is generated by high impact forming.

* * * * *